(12) United States Patent
Sun et al.

(10) Patent No.: US 9,116,409 B1
(45) Date of Patent: Aug. 25, 2015

(54) ELECTROCHROMIC DEVICES WITH SI, SN, SIO$_2$ AND SNO$_2$ DOPED ANODES

(71) Applicant: APPLIED MATERIALS, INC., Santa Clara, CA (US)

(72) Inventors: Lizhong Sun, San Jose, CA (US); Byung-Sung Leo Kwak, Portland, OR (US); Jan C. Isidorsson, Sunnyvale, CA (US); Chong Jiang, Cupertino, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 95 days.

(21) Appl. No.: 13/898,886

(22) Filed: May 21, 2013

Related U.S. Application Data

(60) Provisional application No. 61/649,813, filed on May 21, 2012.

(51) Int. Cl.
*G02F 1/15* (2006.01)
*G02F 1/03* (2006.01)
*G09G 3/19* (2006.01)
*H04N 9/16* (2006.01)

(52) U.S. Cl.
CPC ........................................ *G02F 1/15* (2013.01)

(58) Field of Classification Search
CPC ..... G02F 1/1523; G02F 1/1533; G02F 1/155; G02F 1/0102; G02F 1/163; G09G 3/16
USPC ......... 359/265–275, 277, 245–247, 254, 242; 345/49, 105; 250/70; 348/817; 438/929
See application file for complete search history.

(56) References Cited

U.S. PATENT DOCUMENTS

| | | | | |
|---|---|---|---|---|
| 4,325,611 | A | * | 4/1982 | Huggins et al. ............... 359/273 |
| 4,839,007 | A | * | 6/1989 | Kotz et al. ..................... 205/688 |
| 5,995,271 | A | | 11/1999 | Zieba et al. |
| 6,320,311 | B2 | | 11/2001 | Nakaya et al. |
| 2001/0008728 | A1 | * | 7/2001 | Turner et al. ............... 429/218.1 |
| 2002/0031602 | A1 | * | 3/2002 | Zhang ............................. 427/58 |
| 2005/0254114 | A1 | * | 11/2005 | Shinohara et al. ............ 359/265 |
| 2014/0147747 | A1 | * | 5/2014 | King et al. .................... 429/211 |

OTHER PUBLICATIONS

Granqvist, C.-G., "Electrochromic Materials: Out of a Niche," Nature Materials, vol. 5, No. 2, Feb. 2006, pp. 89-90.

* cited by examiner

*Primary Examiner* — Dawayne A Pinkney
(74) *Attorney, Agent, or Firm* — Pillsbury Winthrop Shaw Pittman LLP (57) ABSTRACT

The present invention generally relates to electrochemical devices, such as electrochromic (EC) devices and thin film batteries (TFB), and in particular to anodes of electrochemical devices with improved intercalation and/or transport properties. Some embodiments of the invention include anodes, such as nickel oxide, doped with Si, Sn, SiO$_2$ and/or SnO$_2$, which may be in the form of nanoparticles or even substituted atoms/molecules. These nanoparticles/substituted atoms, which have higher lithium intercalation capability, distort the lattice of the anode, improving movement and intercalation of Li ions. In some other embodiments, the anode may be formed of silicon oxide and/or tin oxide, which materials have good transport and intercalation of Li ions.

20 Claims, 9 Drawing Sheets

FIG. 1

PRIOR ART

FIG. 2

PRIOR ART

FIG. 8 ns with Si, Sn, SiO$_2$ and SnO$_2$ doped anodes.

ELECTROCHROMIC DEVICES WITH SI, SN, SIO$_2$ AND SNO$_2$ DOPED ANODES

CROSS-REFERENCE TO RELATED APPLICATIONS

This application claims the benefit of U.S. Provisional Application No. 61/649,813 filed May 21, 2012, incorporated herein by reference in its entirety.

FIELD OF THE INVENTION

Embodiments of the present invention relate generally to anode materials for electrochemical devices, such as electrochromic devices, and more particularly to electrochromic devices with Si, Sn, SiO$_2$ and SnO$_2$ doped anodes.

BACKGROUND OF THE INVENTION

Electrochromic devices are devices that change light (and heat) transmission properties in response to voltage applied across the device. Electrochromic devices can be fabricated which electrically switch between transparent and translucent states (where the transmitted light is colored). Furthermore, certain transition metal hydride electrochromic devices can be fabricated which switch between transparent and reflective states. Electrochromic devices are incorporated in a range of products, including architectural windows, rear-view mirrors, and protective glass for museum display cases.

Figure 1:
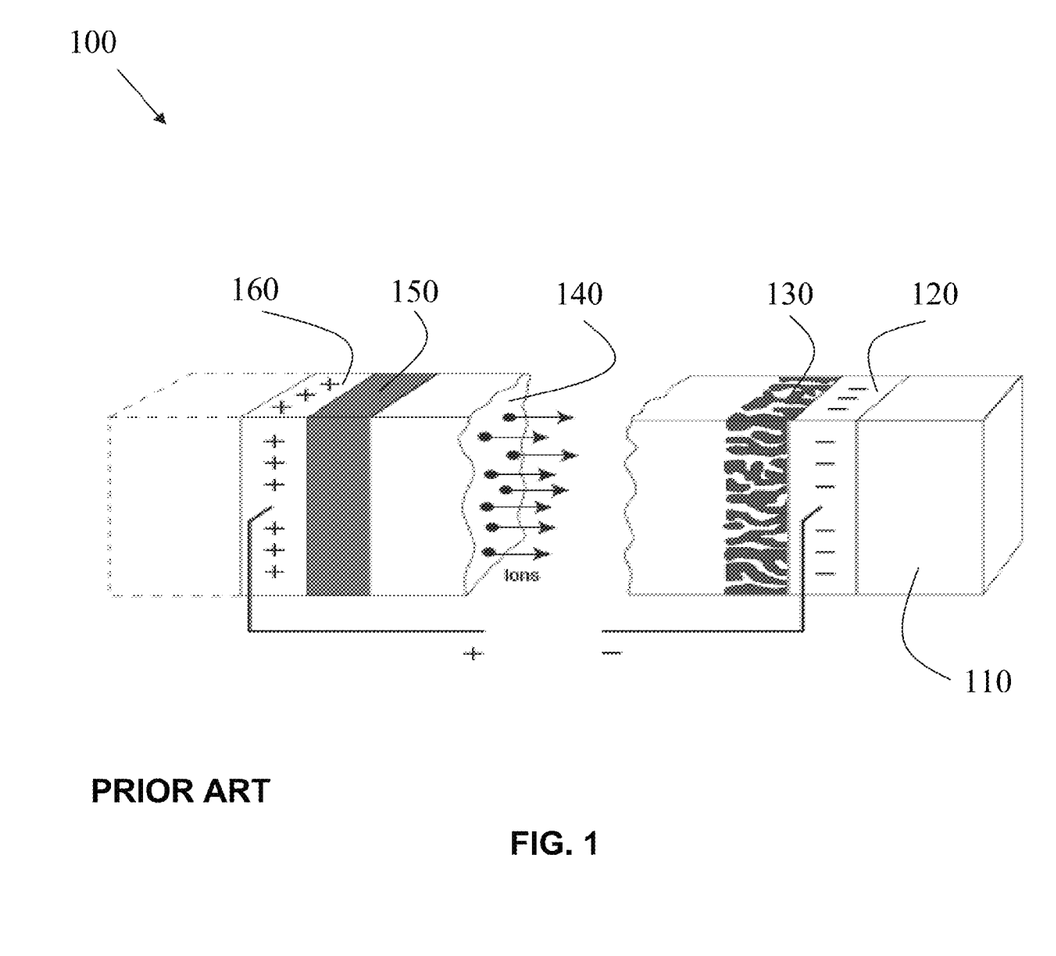
FIG. 1 illustrates a schematic representation of an electrochromic device showing ion conduction between anode and cathode.
Figure 2:
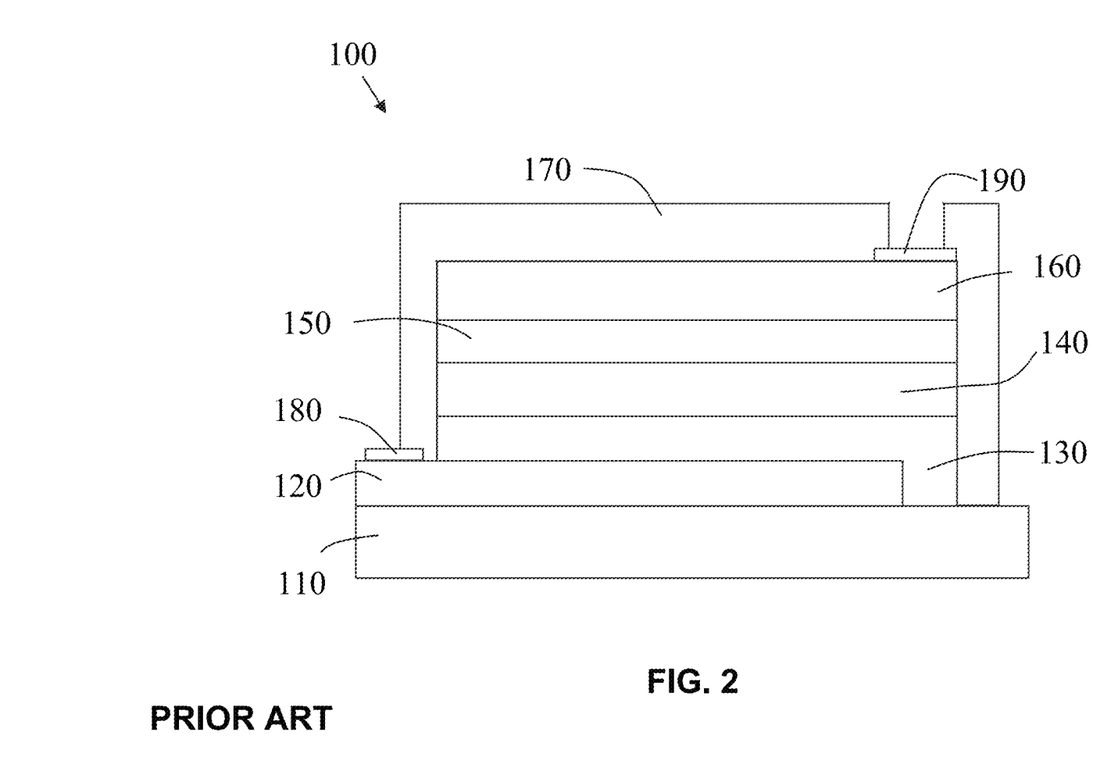
FIG. 2 is a cross-sectional representation of a prior art electrochromic device.

A prior art electrochromic device 100 is represented in FIGS. 1 & 2, which show a schematic representation of the electrochromic device illustrating ion conduction between anode and cathode, and a cross-sectional representation of the electrochromic device, respectively. See Granqvist, C.-G., Nature Materials, v5, n2, February 2006, p 89-90; C.-G. Granqvist *Handbook of Inorganic Electrochromic Materials*, Elsevier, 1995; and U.S. Pat. No. 5,995,271 to Zieba et al. The device 100 comprises a glass substrate 110, lower transparent conductive oxide (TCO) layer 120, a cathode 130, a solid electrolyte 140, a counter electrode (anode) 150, upper TCO layer 160, a protective coating 170, a first electrical contact 180 (to the lower TCO layer 120), and a second electrical contact 190 (to the upper TCO layer 160). Furthermore, there may be a diffusion barrier layer (not shown) between the glass substrate 110 and the lower TCO layer 120, to reduce the diffusion of ions from the glass substrate into the TCO layer, and vice versa. Note that the component layers are not drawn to scale in the electrochromic devices shown in FIGS. 1 & 2. For example, a typical glass substrate is of the order of a millimeter thick and a typical electrochromic device covers the fully exposed area of the architectural glass, or rear-view mirror, for example. Other substrate materials may be used, for example plastics such as polyimide (PI), polyethylene terephthalate (PET) and polyethylene naphthalate (PEN). Typical component layer thicknesses are given in the table below:

| Component Layer | Thickness (microns) |
| --- | --- |
| lower TCO layer | 0.1 to 1.0 |
| cathode | 0.03 to 1.0 |
| solid electrolyte | 0.005 to 5 |
| counter electrode | 0.03 to 1.0 |
| upper TCO layer | 0.1 to 1.0 |
| diffusion barrier layer | 0.1 to 1.0 |

Switching from a transparent to a colored state, for example, occurs when ions (such as lithium or hydrogen ions) are driven from the counter electrode 150, through the (non electrically conductive) solid electrolyte 140, to the cathode 130. The counter electrode 150 is an ion storage film, and the cathode 130 is electrochromic—providing the desired change in light transmission properties. It is also possible for the counter electrode 150 to function as the electrochromic layer if this layer undergoes an "anodic coloration," where the layer changes from transparent to colored with de-intercalation of the ion. In this case, the cathode becomes the counter electrode. One can also create greater contrast by combining the effects of both electrodes. A more detailed discussion of the functioning of electrochromic devices is found in Granqvist, C.-G., Nature Materials, v5, n2, February 2006, p 89-90 and C.-G. Granqvist *Handbook of Inorganic Electrochromic Materials*, Elsevier, 1995. For the device to function properly, the lower TCO layer 120 and the cathode 130 must be electrically isolated from the counter electrode 150 and upper TCO layer 160. Electrical contact to external driver circuits is made through the first and second electrical contacts 180 and 190.

Lithium intercalation and transport are determining factors in the performance of an electrochromic (EC) device. Currently, the most commonly used cathode and anode materials are WO$_3$ and variations of NiO films, respectively, in which lithium intercalation and transport in the anode are the bottlenecks. Thus, the electrochemical reaction speed and device performance are limited. There is a need for anode materials which promote the anodic reaction.

Furthermore, there is a need for improved anode materials in other electrochemical devices, such as thin film batteries (TFB).

SUMMARY OF THE INVENTION

The present invention generally relates to electrochemical devices, such as electrochromic (EC) devices and thin film batteries (TFB), and in particular to anodes of electrochemical devices with improved intercalation and/or transport properties. Some embodiments of the invention include anodes, such as nickel oxide, doped with Si, Sn, SiO$_2$ and/or SnO$_2$, which may be in the form of nanoparticles or even substituted atoms/molecules. These nanoparticles/substituted atoms, which have higher lithium intercalation capability, distort the lattice of the anode, improving movement and intercalation of Li ions. In some other embodiments, the anode may be formed of silicon oxide and/or tin oxide, which materials have good transport and intercalation of Li ions.

According to some embodiments of the present invention, an electrochromic device may include a stack comprising a cathode, an electrolyte and an anode wherein the anode comprises an anode material such as NiO doped with nanoparticles of Si, SiO$_2$, Sn and/or SnO$_2$, or even substituted atoms/molecules of the aforesaid dopants, for example. The anode material may have the following stoichiometry: (1) A$_x$(MO$_y$)$_z$, where z=1-x, A=SiO$_2$, SnO$_2$ and x=0.5%-10%, preferred range 2%-6%, M=Ni, Ta, Ti, & Mo, where M may be one or more of the metals listed, y is given by 0.80 (v/2)≤y≤v/2, where v is the valence of M, and z=90%-99.5%, preferred range 94%-98%; and (2) B$_x$(MO$_y$)$_z$, where z=1-x, B=Si, Sn and x=0.5%-10% with a preferred value of 1%-3%, M=Ni, Ta, Ti, & Mo, y is given by 0.80(v/2)≤y≤v/2, where v is the valence of M, and z=90%-99.5% with a preferred range of 97%-99%. Furthermore, the anode may comprise SiO$_2$ and/or SnO$_2$. Yet furthermore, the anode may comprise sub-oxides of silicon and/or tin—SiO$_a$ and/or SnO$_b$, where $1.8 \leq a < 2$ and/or $1.8 \leq b < 2$. Herein, the values of x, y, z, a and b provide the atomic or molecular ratios for the anode material.

According to some embodiments of the present invention, a method of forming an electrochromic device may include forming a stack comprising depositing a cathode, an electrolyte and an anode, wherein the depositing of the anode layer may include depositing material such as: (1) NiO doped with nanoparticles of Si, $SiO_2$, Sn and/or $SnO_2$, or substituted atoms/molecules of the aforesaid dopants, for example; or (2) $SiO_2$ or $SnO_2$. The depositing of the anode layer can be by a physical vapor deposition (PVD) process.

Furthermore, this invention describes tools configured for carrying out the above methods.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION

Embodiments of the present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The present invention generally relates to electrochemical devices, such as EC devices and TFBs, and anode materials for improved lithium intercalation capability and diffusion speed inside an anode. Electrochromic devices may be cathodically colored, anodically colored or a combination of both. The coloration may occur because of an intercalation reaction of the cathode material or anode material with an ion, such as lithium, between the cathode layer and the anode/counter electrode layer.

Figure 3:
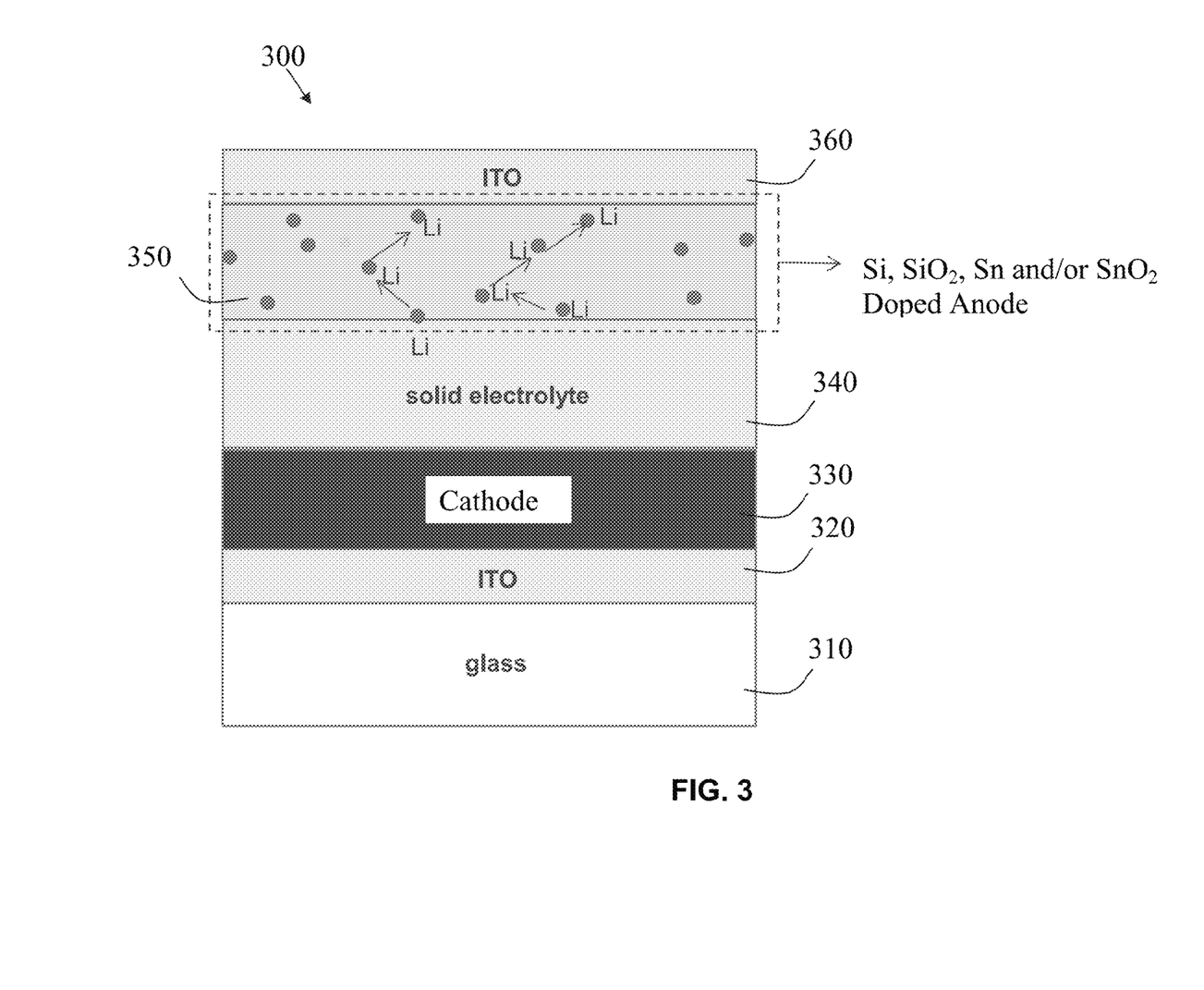
FIG. 3 is a cross-sectional representation of an electrochromic device with a doped anode showing Li intercalation, according to some embodiments of the present invention.

FIG. 3 shows a cross-sectional representation of an electrochromic device according to some embodiments of the present invention. The device 300 comprises a glass substrate 310, an indium tin oxide (ITO) lower transparent conductive oxide (TCO) layer 320, a cathode 330, a solid electrolyte 340 and an anode 350. An upper TCO layer, protective coating, a first electrical contact (to the lower TCO layer 320), and a second electrical contact (to the upper TCO layer) may be added to complete the electrochromic device. Furthermore, there may be a diffusion barrier layer between the glass substrate 310 and the lower TCO layer 320. The anode 350 comprises an anode material such as NiO doped with nanoparticles of Si, $SiO_2$, Sn and/or $SnO_2$, or substituted atoms/molecules of the aforesaid dopants, for example. The nanoparticles and substituted atoms/molecules may distort the lattice of the anode material increasing lithium intercalation capability and making diffusion of Li through the anode faster, such that Li diffusion in the anode may match the Li diffusion rate in typical cathode materials such as $WO_N$, thus permitting transport and intercalation in the cathode to no longer be limited by the anodic reaction. (The lithium diffusion coefficient in $WO_3$ is typically in the range of $10^{-9}$ to $10^{-11}$ cm$^2$/s, depending on the lithium content of the material.)

The addition of dopants of nanoparticles of Si, $SiO_2$, Sn, SnO2, or even substituted atoms/molecules of the aforesaid dopants, in anode materials (e.g., $NiO_y$) improves lithium intercalation and transport inside the anode electrode due to the higher ion storage capacity and lithium intercalation capability of the composite anode material. Each uniformly scattered atomic Si or molecular $SiO_2$, for example, inside the anode acts as an acceleration center for lithium intercalation and transport. Therefore, the entire electrochemical reaction of both cathodic and anodic sides is promoted, so that the coloration speed of electrochromic devices is enhanced. Note that nanoparticles here refer to particles which range from 1 nanometer to less then 1 micron in diameter. The density of nanoparticles may be increased to improve intercalation and transport, but preferably only to a density that does not significantly affect the optical transmittance of the bulk anode material as required for electrochromic device functionality.

Anodic materials according to some embodiments of the present invention may include films with composition represented by the following stoichiometric formulas: (1) $A_x(MO_y)_z$, where $z=1-x$, $A=SiO_2$, $SnO_2$ and $x=0.5\%-10\%$, preferred range 2%-6%, M=Ni, Ta, Ti, & Mo, where M may be one or more of the metals listed, y is given by $0.80(v/2) \leq y \leq v/2$, where v is the valence of M, and z=0-99.5%, preferred range 94%-98%; and (2) $B_x(MO_y)_z$, where $z=1-x$, B=Si, Sn and $x=0.5\%-10\%$ with a preferred value of 1%-3%, M=Ni, Ta, Ti, & Mo, y is given by $0.80(v/2) \leq y \leq v/2$, where v is the valence of M, and z=90%-99.5% with a preferred range of 97%-99%. Herein, the values of x, y, z, a and b provide the atomic or molecular ratios for the anode material.

Figure 4:
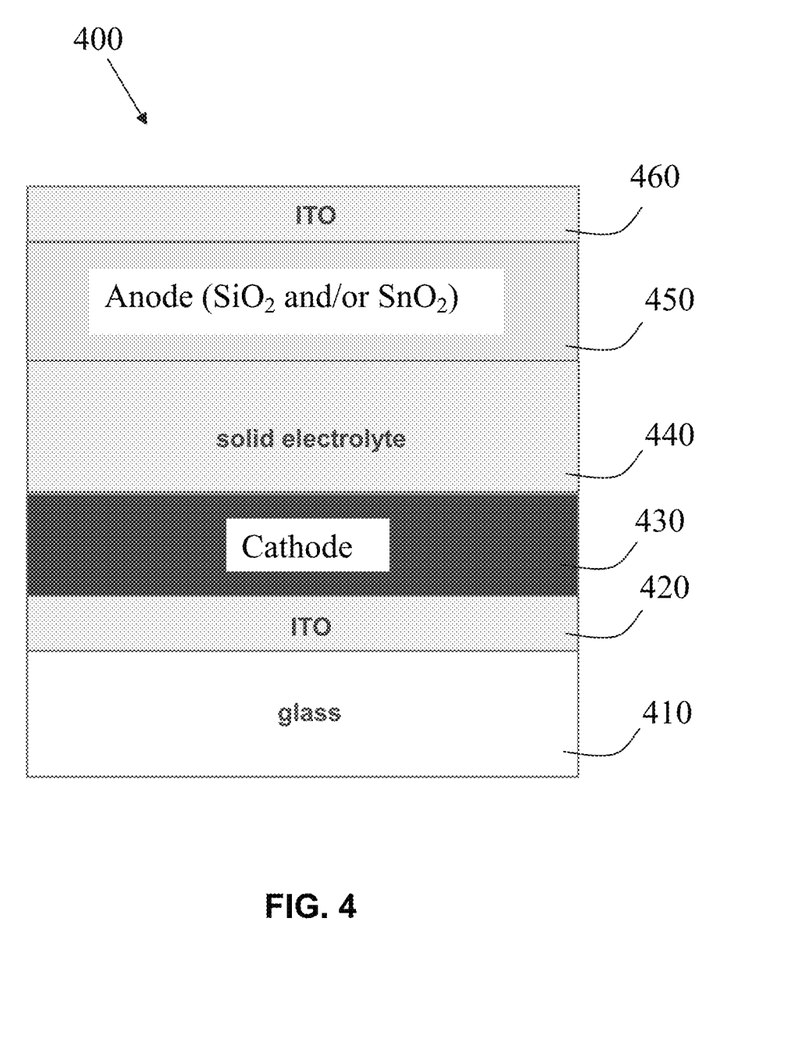
FIG. 4 is a cross-sectional representation of an electrochromic device with an $SiO_2$ or $SnO_2$ anode, according to some embodiments of the present invention.

FIG. 4 shows a cross-sectional representation of an electrochromic device according to some embodiments of the present invention. The device 400 comprises a glass substrate 410, an indium tin oxide (ITO) lower transparent conductive oxide (TCO) layer 420, a cathode 430, a solid electrolyte 440, an anode 450 and an upper TCO layer 460. A protective coating, a first electrical contact (to the lower TCO layer 420), and a second electrical contact (to the upper TCO layer) may be added to complete the electrochromic device. Furthermore, there may be a diffusion barrier layer between the glass substrate 410 and the lower TCO layer 420. The anode 450 may comprise $SiO_2$ and/or $SnO_2$. Furthermore, the anode may comprise suboxides—$SiO_a$ and/or $SnO_b$, where a<2 and/or b<2, and in some embodiments $1.8 \leq a < 2$ and/or $1.8 \leq b < 2$. These materials show good Li ion transport and intercalation properties, although they are not coloring anodes. The benefit of non-coloring anodes is that unlike most anode materials, these materials do not reduce cathode transparency in a clear state; furthermore, there are a variety of deposition methods that can be used to deposit cathodes of these materials.

Figure 5A:
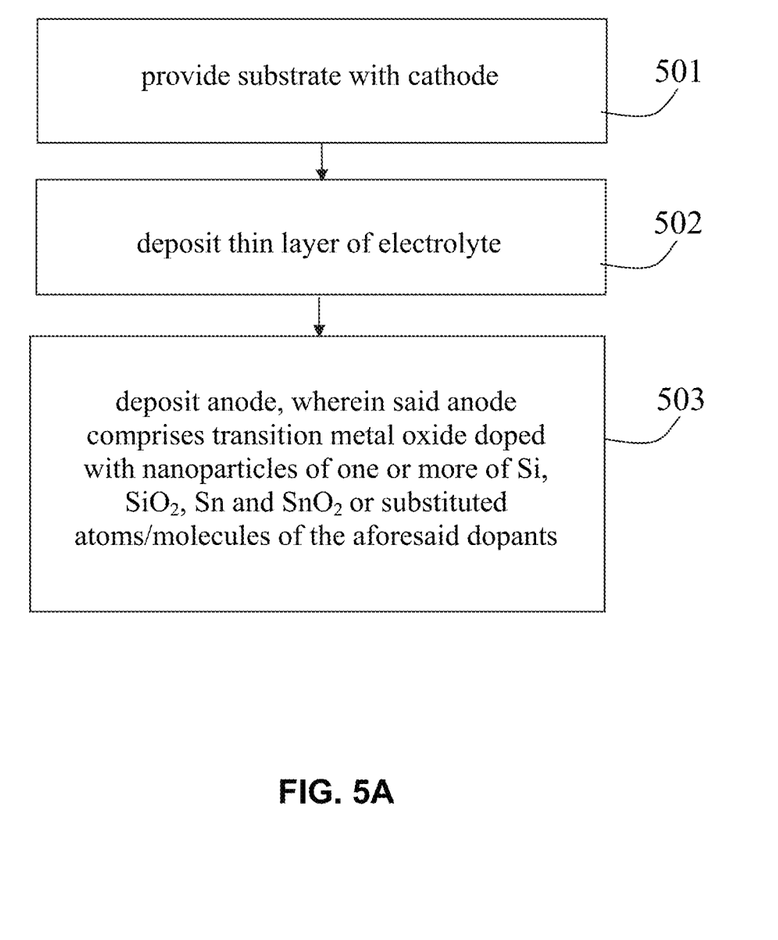
FIGS. 5A and 5B are flow charts for deposition of an anode, according to some embodiments of the present invention.
Figure 5B:
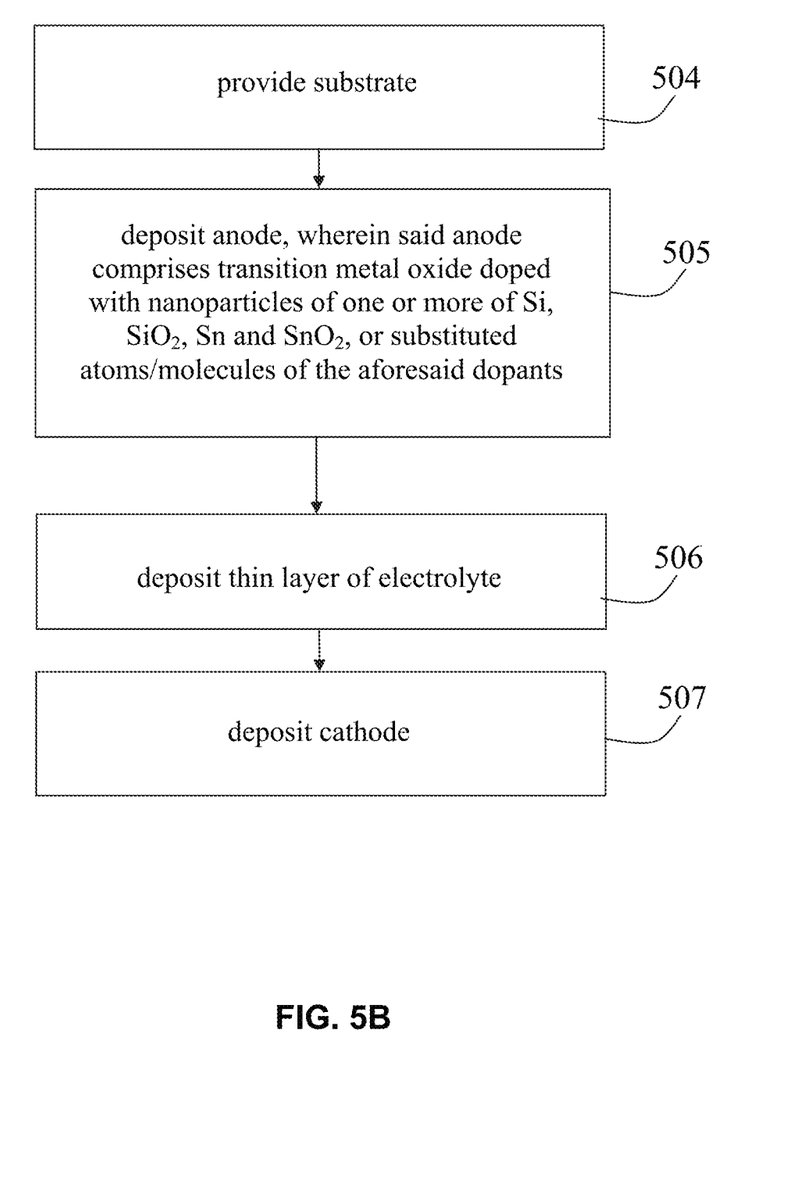

As shown in FIG. 5A, a process flow, such as with steps 501-503, for fabricating an electrochromic device according to the present invention may include: providing a substrate; depositing a cathode layer; depositing an electrolyte layer on the cathode layer; and depositing an anode on the electrolyte layer. Wherein depositing of the anode layer may include depositing material such as: (1) NiO doped with nanoparticles of Si, $SiO_2$, Sn and/or $SnO_2$, or substituted atoms/molecules of the aforesaid dopants, for example; (2) $SiO_2$ and/or $SnO_2$. Furthermore, the order in which the layers is deposited may be reversed, e.g. substrate, anode, electrolyte and cathode, as shown in FIG. 5B with steps 504-507.

The anode layer may be deposited by a PVD deposition method, although other methods may also be used, such as plasma-enhanced chemical vapor deposition (PECVD), electron or ion beam evaporation, thermal evaporation, etc. For a PVD process, the process may be AC, DC, pulsed DC, RF, HF or a combination thereof. In one embodiment, the anode layer may have a thickness of approximately 0.03 to 1.0 micron. In one embodiment, the sputtering target may comprise the same material as the deposited layer and be performed by pulsed DC sputtering or RF sputtering in an argon or $Ar/O_2$, ambient environment. In another embodiment, the sputtering target may comprise a metal and be reactively sputtered in a reactive atmosphere. In yet another embodiment the sputtering target may comprise $MO_y$, where M=Ni, Ta, Ti, & Mo, and nanoparticles of Si, Sn, $SiO_2$ and/or $SnO_2$.

Figure 6:
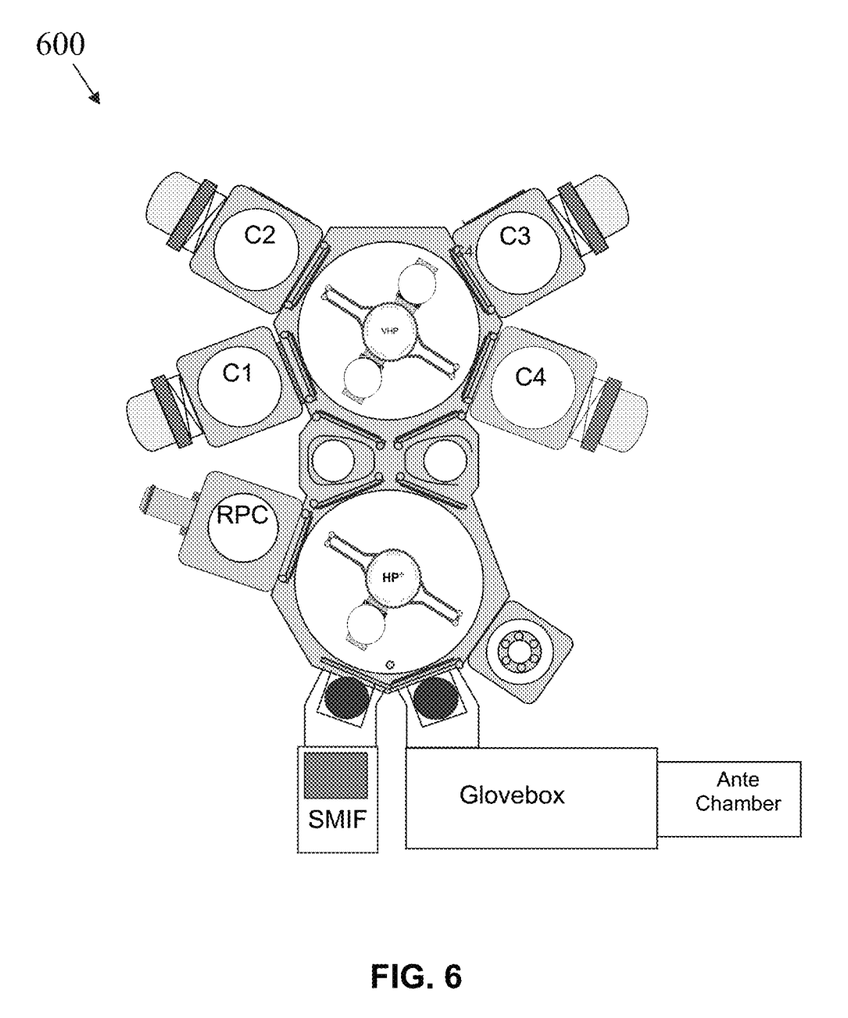
FIG. 6 is a schematic illustration of a thin film deposition cluster tool, according to some embodiments of the present invention.

FIG. 6 is a schematic illustration of a processing system 600 for fabricating an electrochemical device, such as an EC device, according to some embodiments of the present invention. The processing system 600 includes a standard mechanical interface (SMIF) to a cluster tool equipped with a reactive plasma clean (RPC) chamber and process chambers C1-C4, which may be utilized in the process steps described above. A glovebox may also be attached to the cluster tool, if needed. The glovebox can store substrates in an inert environment (for example, under a noble gas such as He, Ne or Ar), which is useful after alkali metal/alkaline earth metal deposition. An antechamber to the glovebox may also be attached to the cluster tool if needed—the ante chamber to the glovebox is a gas exchange chamber (inert gas to air and vice versa) which allows substrates to be transferred in and out of the glovebox without contaminating the inert environment in the glovebox. (Note that a glovebox can be replaced with a dry room ambient of sufficiently low dew point as such is used by lithium foil manufacturers.) The chambers C1-C4 can be configured for process steps for manufacturing electrochromic devices which may include deposition of an anode, as described above. Examples of suitable cluster tool platforms include Applied Material's Endura™, and Centura™ for smaller substrates. Should more process chambers be required for deposition of an electrochromic device, then a cluster tool with a larger number of chambers may be used, or multiple cluster tools may be connected together to provide the required processing and transfer capabilities. For example, a large cluster tool may include: one processing chamber for depositing a barrier layer over the substrate; a second processing chamber for fabrication of the transparent conductive coating layer over the barrier layer; a third processing chamber for fabrication of a cathode (coloration layer) over the transparent conductive coating layer; a fourth processing chamber for fabrication of the electrolyte layer over the coloration layer; a fifth processing chamber for fabrication of the anode layer over the electrolyte layer; a sixth processing chamber for fabrication of the second transparent conductive coating over the anode layer; and a seventh processing chamber for fabrication of the capping or barrier layer over the EC device. It is to be understood that while a cluster arrangement has been shown for the processing system 600, a linear system may be utilized in which the processing chambers are arranged in a line without a transfer chamber so that the substrate continuously moves from one chamber to the next chamber.

Figure 7:
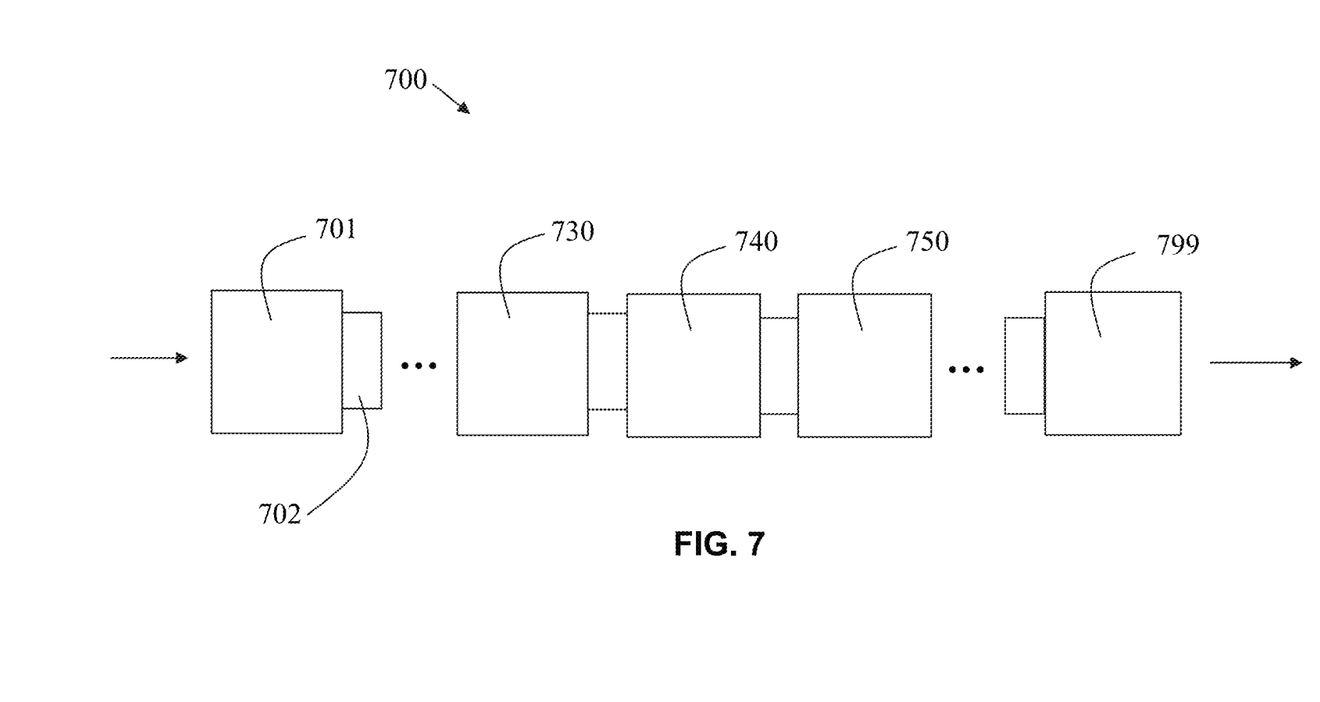
FIG. 7 is a representation of a thin film deposition system with multiple in-line tools, according to some embodiments of the present invention.

FIG. 7 shows a representation of an in-line fabrication system 700 with multiple in-line tools 701 through 799, including tools 730, 740, 750, according to some embodiments of the present invention. In-line tools may include tools for depositing all the layers of an electrochemical device, such as an electrochromic device. Furthermore, the in-line tools may include pre- and post-conditioning chambers. For example, tool 701 may be a pump down chamber for establishing a vacuum prior to the substrate moving through a vacuum airlock 702 into a deposition tool. Some or all of the in-line tools may be vacuum tools separated by vacuum airlocks. Note that the order of process tools and specific process tools in the process line will be determined by the particular electrochromic device fabrication method being used. For example, one of the in-line tools may be dedicated to depositing an anode layer, as described above. Furthermore, substrates may be moved through the in-line fabrication system oriented either horizontally or vertically.

Figure 8:
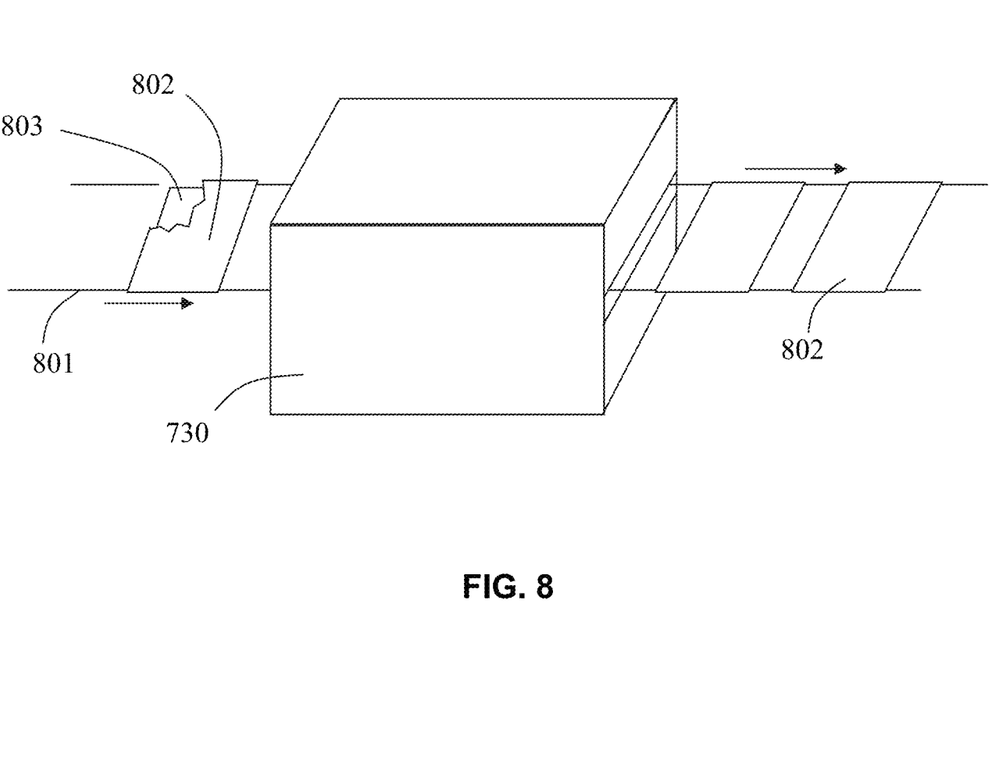
FIG. 8 is a representation of an in-line deposition tool, according to some embodiments of the present invention.

In order to illustrate the movement of a substrate through an in-line fabrication system such as shown in FIG. 7, in FIG. 8 a substrate conveyer 801 is shown with only one in-line tool 730 in place. A substrate holder 802 containing a substrate 803 (the substrate holder is shown partially cut-away so that the substrate can be seen) is mounted on the conveyer 801, or equivalent device, for moving the holder and substrate through the in-line tool 730, as indicated. A suitable in-line platform for processing tool 730 with vertical substrate configuration is Applied Material's New Aristo™. A suitable in-line platform for processing tool 730 with horizontal substrate configuration is Applied Material's Aton™.

The apparatus of FIGS. 6 and 7 may be used to fabricate electrochromic devices according to the process flow provided above. For example, in a first system, such as C1 or 730, a first transparent conductive layer is deposited over a substrate. In a second system, a doped coloration layer is deposited over the first transparent conductive layer. In a third system, an electrolyte layer is deposited over the doped coloration layer. In a fourth system, a doped anode layer is deposited over the electrolyte layer. In a fifth system a second transparent conductive layer is deposited over the doped anode layer. Further systems may be used for deposition of other device layers, as described above, such as a barrier layer and/or a capping layer.

Although the present invention has been particularly described with reference to certain embodiments thereof, it should be readily apparent to those of ordinary skill in the art that changes and modifications in the form and details may be made without departing from the spirit and scope of the invention.

What is claimed is:

1. An anode material for an electrochemical device represented by the stoichiometric formula $A_x(MO_y)_z$, wherein:
   A is at least one of Si, Sn, $SiO_2$ and $SnO_2$;
   M is at least one of Ni, Ta, Ti and Mo;
   $0.005 \leq x \leq 0.10$ and $z=1-x$; and
   $0.80(v/2) \leq y \leq v/2$, wherein v is the valence of M.

2. The anode material as in claim 1, wherein A is at least one of $SiO_2$ and $SnO_2$ and $0.02 \leq x \leq 0.06$.

3. The anode material as in claim 1, wherein A is at least one of Si and Sn and $0.01 \leq x \leq 0.03$.

4. The anode material as in claim 1, wherein $y=v/2$.

5. The anode material as in claim 1, wherein said anode material comprises $MO_y$ doped with nanoparticles of A.

6. The anode material as in claim 1, wherein M is Ni.

7. The anode material as in claim 1, wherein said electrochemical device is an electrochromic device.

8. The anode material as in claim 1, wherein the lithium diffusion coefficient in said anode material is greater than or equal to $10^{-9}$ cm$^2$s$^{-1}$.

9. An electrochromic device, comprising:
   a cathode;
   an electrolyte covering said cathode; and
   an anode covering said electrolyte;
   wherein said anode comprises an anode material represented by the stoichiometric formula $A_x(MO_y)_z$, wherein:
   A is at least one of Si, Sn, $SiO_2$ and $SnO_2$;
   M is at least one of Ni, Ta, Ti and Mo;
   $0.005 \leq x \leq 0.10$ and $z=1-x$; and
   $0.80(v/2) \leq y \leq v/2$, wherein v is the valence of M.

10. The electrochromic device as in claim 9, wherein the lithium diffusion rate in said anode material is greater than or equal to the lithium diffusion rate in said cathode.

11. The anode material as in claim 9, wherein the lithium diffusion coefficient in said anode material is greater than or equal to $10^{-9}$ cm$^2$s$^{-1}$.

12. The electrochromic device as in claim 9, wherein A is at least one of Si and Sn and $0.01 \leq x \leq 0.03$.

13. The electrochromic device as in claim 9, wherein A is at least one of $SiO_2$ and $SnO_2$ and $0.02 \leq x \leq 0.06$.

14. The electrochromic device as in claim 9, wherein M is Ni.

15. The electrochromic device as in claim 9, wherein $y=v/2$.

16. The electrochemical device as in claim 9, wherein said anode material comprises $MO_y$ doped with nanoparticles of A.

17. An electrochromic device, comprising:
   a cathode;
   an electrolyte covering said cathode; and
   an anode covering said electrolyte;
   wherein said anode comprises at least one of Si and Sn, and wherein a lithium diffusion rate in said anode is greater than or equal to the lithium diffusion rate in said cathode.

18. The electrochromic device as in claim 17, wherein the lithium diffusion rate in said anode is greater than or equal to $10^{-9}$ cm$^2$s$^{-1}$.

19. The electrochromic device as in claim 17, wherein said anode comprises $SiO_a$ and wherein $1.80 \leq a \leq 2$.

20. The electrochromic device as in claim 17, wherein said anode comprises $SnO_b$ and wherein $1.80 \leq b \leq 2$.

* * * * *

UNITED STATES PATENT AND TRADEMARK OFFICE
CERTIFICATE OF CORRECTION

| | | |
|---|---|---|
| PATENT NO. | : 9,116,409 B1 | Page 1 of 1 |
| APPLICATION NO. | : 13/898886 | |
| DATED | : August 25, 2015 | |
| INVENTOR(S) | : Sun et al. | |

It is certified that error appears in the above-identified patent and that said Letters Patent is hereby corrected as shown below:

In the Specification

In Column 4, Line 31, delete "$WO_N$," and insert -- $WO_x$, --, therefor.

In Column 4, Line 49, delete "then" and insert -- than --, therefor.

In the Claims

In Column 8, Line 19, in Claim 16, delete "electrochemical" and insert -- electrochromic --, therefor.

Signed and Sealed this
Fifth Day of July, 2016

Michelle K. Lee
*Director of the United States Patent and Trademark Office*